United States Patent [19]

Hsu

[11] Patent Number: 5,972,407
[45] Date of Patent: *Oct. 26, 1999

[54] TREATMENT OF UNCOOKED PASTA PRODUCTS TO REDUCE COOKING LOSS

[75] Inventor: Jau Yann Hsu, Brookfield, Conn.

[73] Assignee: Nestec S.A., Vevey, Switzerland

[ * ] Notice: This patent is subject to a terminal disclaimer.

[21] Appl. No.: 08/773,801

[22] Filed: Jan. 24, 1997

Related U.S. Application Data

[63] Continuation of application No. 08/501,768, Jul. 13, 1995, abandoned, which is a continuation-in-part of application No. 08/313,766, Sep. 28, 1994, Pat. No. 5,573,804.

[51] Int. Cl.⁶ ..................................................... A23L 1/162
[52] U.S. Cl. ........................ 426/557; 426/451; 426/506; 426/508; 426/521
[58] Field of Search .................................. 426/496, 549, 426/451, 557, 506, 500, 508, 511, 521

[56] References Cited

U.S. PATENT DOCUMENTS

| | | |
|---|---|---|
| 3,537,862 | 11/1970 | Peters et al. . |
| 4,368,210 | 1/1983 | Murakami et al. . |
| 4,370,352 | 1/1983 | Murakami et al. . |
| 4,675,199 | 6/1987 | Hsu . |
| 4,734,291 | 3/1988 | Raffensperger . |
| 5,063,072 | 11/1991 | Gillmore et al. . |
| 5,139,808 | 8/1992 | Barnes et al. ............................ 426/557 |
| 5,151,289 | 9/1992 | Ozawa et al. . |
| 5,256,435 | 10/1993 | Cuperus . |
| 5,294,452 | 3/1994 | De Francisci . |

FOREIGN PATENT DOCUMENTS

| | | |
|---|---|---|
| 0626137 | 11/1994 | European Pat. Off. . |
| 2071479 | 9/1981 | United Kingdom . |

*Primary Examiner*—Lien Tran
*Attorney, Agent, or Firm*—Vogt & O'Donnell, LLP

[57] ABSTRACT

Uncooked pasta is steamed to obtain a surface-gelatinised pasta which then is contacted with water to obtain a wet pasta, and the wet pasta is steamed to obtain a pasta product which is at least partially cooked. The pasta product may be refrigerated, or may be dried, or may be dried and mixed with water and sauce and then rotary retorted.

23 Claims, No Drawings

TREATMENT OF UNCOOKED PASTA PRODUCTS TO REDUCE COOKING LOSS

CROSS-REFERENCE TO RELATED APPLICATION

This application is a continuation application of application Ser. No. 08/501,768, which was filed Jul. 13, 1995 and which now is abandoned and which, in turn, is a continuation-in-part application of application Ser. No. 08/313,766, filed Sept. 28, 1994, now U.S. Pat. No. 5,573,804.

BACKGROUND OF THE INVENTION

1. Technical Field

The present invention relates to a process for the production of a quick-cooking pasta or a retorted pasta more particularly a dry or wet uncooked pasta.

2. Description of Prior Art

U.S. Pat. No. 5,063,072 describes a process for preparing a fast-cooking pasta which comprises soaking uncooked pasta in water for a period of time sufficient to hydrate the pasta and then cooking the soaked pasta by heating for a period of time shorter than would be needed to cook pasta which had not been previously been soaked. It is also stated that, before soaking, the uncooked pasta may be dried at a temperature of from 165° F. to 190° F. (74° C. to 88° C.), depending on the dough composition, to obtain a dry pasta which can tolerate cold water soaking. Drying methods described in this patent include hot air, microwave and superheated steam.

U.S. Pat. No. 5,256,435 describes a process for preparing a dried pasta which can rapidly be reconstituted for consumption which comprises steaming a formed, wet pasta while intermittently spraying water having a pH of from 5 to 5.5 and a temperature of 90° C. onto the formed pasta, so that the temperature of the formed pasta steamed and sprayed does not fall below 97° C., to cook and hydrate the formed pasta to obtain a cooked pasta having a dry matter content of from 35% to 45% by weight and then drying the cooked pasta. The losses of starting material, essentially starch, are said to be from 6 to 8% by weight. The pasta is completely cooked by this process.

SUMMARY OF THE INVENTION

According to the present invention, there is provided a process for treating an uncooked pasta for the production of a quick-cooking pasta which comprises steaming an uncooked pasta to obtain a surface-gelatinised pasta, contacting the surface-gelatinised pasta with water to obtain a wet pasta and then steaming the wet pasta to obtain a pasta which is at least partially cooked.

DETAILED DESCRIPTION OF THE INVENTION

Neither in this invention, long pastas means any pastas which are not "short goods pasta" and includes spaghetti and linguine, etc., "short goods pastas" hereinafter referred to as "short pastas", include rotini, spiral, elbow, shell, macaroni, ziti, short noodle, rigatoni or penne etc. which are usually packaged in a bag instead of a long box and are less than 7 cm long. Long pastas comprise strands at least 7 cm long, e.g. at least 10 cm and preferably at least 15 cm long. The strands of regular long pasta are 25.5 cm long but strands or long pastas can be as long 30 cm or even more, e.g. 40 cm. In this invention, by folded, intertwined long pastas, I mean pastas consisting of a plurality of strands having a length of at least 7 cm up to 40 cm or more which are intertwined and folded to give a pasta having a length less than the length of the individual strands. Folded intertwined pastas include pasta nests, matassa or "cakes". Pasta nests have a roughly round shape somewhat similar to a bird's nest. Pasta cakes have a roughly square shape often with a wavy appearance. In matassa, the strands are roughly "layered" together in a more orderly manner usually in a rectangular shape. Folded, intertwined, long pastas are attractive for several reasons. For example, they can be packaged easily, they are suitable for portion and calorie control, and they can be cooked in a regular microwave cooking bowl. However, folded, intertwined long pastas suffer from a sticking problem after cooking, especially if cooked at a temperature less than boiling, whereby starch leaches out to cause stickiness and poor texture. For microwave cooking, it is obviously desirable that the pastas are cooked using cold water at the start because if the water has to be heated first before adding the pastas, most of the convenience aspect of microwave cooking is lost.

I have found that when a dry or wet uncooked short or long pasta is steamed, contacted with water for a short period of time and then steamed again to partially cook it, the treated pasta can be cooked for consumption in water at a temperature less than boiling to give a cooked pasta which has a low cooking loss and which is not only free from stickiness, but also has a good texture.

The pasta may be a short or long pasta consisting of a plurality of unfolded individual strands loosely arranged in mass form may be a plurality of folded and intertwined strands. For instance, the pasta may be a long pasta whose strands are not intertwined, such as spaghetti or linguine, because during their production they are hung in lengths of 1 to 2 metres on sticks with the strands separated and, during this time, they may be steamed, contacted with water and steamed again before cutting, optionally with drying, to the appropriate length. The process of the present invention is especially advantageous when the pasta is a folded, intertwined long pasta.

I have found that if the treated pasta is kept at refrigerated temperature, there is sufficient moisture gain to convert the original dry pasta into a chilled wet pasta which can be cooked in a shorter period of time. However, if desired, before cooking for consumption, the treated pasta of the present invention may optionally be dried.

Surprisingly, I have found that these treated dried pastas can be added directly (without pre-cooking) to sauce (cold or hot) with an appropriate extra amount of water in a continuous, rotary retort (sterilization) process.

The use of dry pastas in a continuous, rotary retort (sterilization) process is a very popular process because the sauce is immediately heated and thickened up and the cans are rotated in order to prevent sedimentation and sticking of the raw, dry pastas. But, even in very short period of time (seconds), the starch in regular, raw, dry pastas will still leach out and cause poor pasta texture. By using the steamed/water added/steamed/dried pastas of the present invention in this type of retorted pasta process, a better retorted pasta can be produced.

The present invention therefore also provides a process for the production of a retorted pasta which comprises steaming a dry or wet uncooked pasta to give a surface-gelatinised steamed pasta, contacting the steamed pasta with water to give a wet pasta, steaming the wet pasta. to give a partially cooked pasta, drying the partially cooked pasta, mixing the dried partially, cooked pasta with an appropriate amount of added water and sauce in a container and sterilising or pasteurising the mixture while rotating the container.

The extra amount of water added to the mixture should be sufficient to provide the dried partially cooked pastas with about 50% to 65% by weight moisture based on the weight of the mixture after sterilisation or pasteurisation. The sterilisation is usually carried out at a temperature from 121° to 130° C. over a period of from 10 to 60 minutes. The sterilising value should be equivalent to about 10 to 60 minutes at 121° C.

The pasteurisation may be carried out in the presence of acidic foods such as tomato sauce, e.g. at pH below 4.5 and heat pressing at 80° to 95° C. for a period of up to 15 minutes. The rotation of the container should be fast enough to prevent substantial sedimentation of the dry pasta.

The moisture content of the dry uncooked pasta is preferably from 3 to 13% by weight based on the total weight of the pasta. The moisture content of the wet uncooked pastas is preferably from 20 to 40% by weight.

The thickness of the pasta strands may be from 0.2 to 2.0 mm and preferably from 0.5 to 1.5 mm.

The dry uncooked folded, intertwined long pasta may weigh from 15 to 100 g usually from 20 to 80 g, for example from 25 to 65 g. The volume of the dry uncooked folded, intertwined long pasta may be from about 50 cm$^3$ to about 270 cm$^3$. Examples of dry uncooked folded, intertwined pastas include pasta nests, pasta cakes and matassa.

The dry pasta is an uncooked pasta preferably dried by a conventional drying process, e.g. at a temperature from 50° to 75° C., relative humidity of 70 to 80% and a long drying time such as from 1 to 10 hours.

The steaming of the dry or wet uncooked pasta gelatinises at least part of the surface of the pasta, e.g. at least 50% and preferably substantially all the surface of the pasta. The steaming may be carried out for a period of from 1 second to 15 minutes, preferably from 10 seconds to 10 minutes and more preferably from 30 seconds to 5 minutes. The temperature of the steam may be from 85° to 100° C. and preferably from 90° to 95° C. Saturated steam or steam at atmospheric condition may conveniently be used, if desired.

Contacting the steamed pasta with water may conveniently be carried out by dipping into water or by spraying with the water. The duration of the contact with the water may suitably be from 0.1 second to 2 minutes, preferably from 0.2 seconds to 1 minute and especially from 0.5 to 30 seconds. The period of contact with the water may be longer than two minutes, e.g. up to 10 minutes if a wet, chilled pasta with a higher moisture content is desired.

The temperature of the water used for contacting the steamed pasta may be from just above freezing point, e.g. from 0.5° C., up to 60° C., preferably from 15° C. to 40° C. and more preferably from 20° C. to 35° C. Ambient temperatures are the most convenient.

The steaming of the wet pasta which has already been treated with steam and water gelatinises the starch sufficiently to give a partially cooked pasta. The gelatinisation is preferably at least 50% and more preferably from 75% to 100%. The steaming may be carried out for a period of from 1 to 30 minutes, preferably from 2.5 to 20 minutes and especially from 5 to 15 minutes. The temperature of the steam may be from 85° to 100° C. and preferably from 90° to 95° C. Saturated steam or steam at atmospheric condition may conveniently be used, if desired.

After steaming the wet pasta, the pasta may be cooled to refrigeration temperatures to give a wet chilled pasta or dried to reduce the moisture content, preferably to a moisture content approximately similar to that of the original dry uncooked pasta. Drying may be carried out by any conventional method, e.g. a heated drum, an infrared tunnel, a microwave oven, a dielectric heater or, more conveniently, by hot air. The drying time may be from 5 to 60 minutes and preferably from 10 to 30 minutes.

The wet chilled pasta may be cooked on a stove top or in a microwave oven within about 2 to 10 minutes. The dried pasta may be reconstituted for consumption by adding to an appropriate amount of cold tap water and heated in a microwave oven, e.g. at high power for from 2 to 10 minutes,preferably from 3 to 7 minutes.

EXAMPLES

The following Examples further illustrate the present invention. In all the Examples, the steam used for the preparation of the samples was steam at atmospheric condition.

Example 1

A test was carried out by preparing four samples derived from 30 g of a pasta nest consisting of vermicilli having strands of 1 mm thickness.

Sample A of the present invention was prepared by steaming the nest at 90° to 95° C. for 2 minutes, dipping into cold tap water for 1 second, steaming again at 90° to 95° C. for 8 minutes and then drying in hot air at 95° C. for 18 minutes to a moisture content of 9.5%.

Sample B (a Comparative Example) was prepared by first dipping the nest into cold tap water for 1 second, steaming for 10 minutes at 90° to 95° C. and then drying at 95° C. in hot air for 18 minutes to a moisture content of 9.4%.

Sample C (a Comparative Example) was prepared by first steaming the nest for 10 minutes at 90° to 95° C. and then drying at 95° C. in hot air for 7 minutes to a moisture content of 9.2%.

Sample D (a Comparative Example) was not subjected to any treatment and had a moisture content of 10.2%.

These samples were tested as follows:
1. Soaking Test

Place 27 g pasta nest in 250 cc water (15° C.) and stand 90 minutes. The drained pasta wt., water wt., % solid in water, % leach-out and % pasta moisture are determined and shown in the following Table.

| Samples | Water wt. | Pasta wt. | % Water solids | % Leach out | Pasta moisture |
|---|---|---|---|---|---|
| A | 208 g | 67 g | 0.24% | 1.8% | 62.3% |
| B | 212 g | 64 g | 0.33% | 2.6% | 59.2% |
| C | 217 g | 57 g | 0.45% | 3.6% | 55.6% |
| D | 222 g | 53 g | 1.26% | 10.4% | 54.2% |

These results show the degree of starch leach-out is in D, C, B, A order, the more the leach-out, the less pasta wt., the more water wt. and the less pasta moisture content (because of less starch to hold moisture). These results also show that steaming alone (sample C) was not as good as steaming/water dipping/steaming (sample A) or water dipping/steaming (sample B) to prevent starch leach-out because of lack of moisture for pasta surface gelatinisation to prevent leach-out of starch.

2. Cooking Test

Place 30 g pasta nest in 300 cc water, stand 10 min. and then microwave at high power for 5 min. After draining off the water, the pasta stickiness was observed and the pasta firmness was determined (by a Texture Analyzer). The results are as follows:

| Samples | Pasta firmness | Pasta stickiness |
| --- | --- | --- |
| A | 5.8 kg | not sticking |
| B | 5.5 kg | sticking |
| C | 4.3 kg | least sticking |
| D | 3.3 kg | most sticking |

Steaming alone (sample C) is the best method to prevent sticking of pasta nest, but its firmness was not as good as sample A or B because of lack of moisture for pasta surface gelatinization and there was more starch leach-out in this sample. By steaming first, then water dipping and steaming (sample A), it can prevent sticking better than a pasta nest dipped in water first, then steaming (sample B) because of steaming effect on the dry pasta nest.

Example 2

A test was conducted by preparing four samples similar to the samples in Example 1 but with thicker pasta consisting of thin spaghetti having a thickness of 1.25 mm and in different fold form (matassa). Comparison of the samples showed similar results like Example 1, but starch leach out was less and the cooked pasta was firmer in texture because of thicker pasta. Sticking of the pastas was also less because of more "space" among pastas in matassa form.

Sample A of the present invention was prepared by steaming the matassa at 90° C. to 95° C. for 2 minutes, dipping into cold tap water for 1 second, steaming again at 90° to 95° C. for 8 minutes and then drying in hot air at 95° C. for 18 minutes to a moisture content of 10.1%.

Sample B (a Comparative Example) was prepared by first dipping the matassa into cold tap water for 10 minutes, steaming for 10 minutes at 90° to 95° C. and then drying at 95° C. in hot air for 18 minutes to a moisture content of 10.3%.

Sample C (a Comparative Example) was prepared by first steaming the matassa for 10 minutes at 90° to 95° C. and then drying at 95° C. in hot air for 10 minutes to a moisture content of 10.4%.

Sample D (a Comparative Example) was not subjected to any treatment and had a moisture content of 10.2%.

1. Soaking Test

Place 27 g matassa pasta in 250 cc water (15° C.) and stand for 90 minutes. The drained pasta wt., water wt., % solids in water, % leach-out and pasta moisture are determined and shown in the following Table:

| Samples | Water wt. | Pasta wt. | % Water solids | % Leach out | Pasta moisture |
| --- | --- | --- | --- | --- | --- |
| A | 216 g | 60 g | 0.12% | 1.0% | 57.6% |
| B | 218 g | 59 g | 0.17% | 1.4% | 56.2% |
| C | 223 g | 52 g | 0.30% | 2.5% | 53.2% |
| D | 227 g | 50 g | 1.35% | 11.3% | 51.8% |

2. Cooking Test

Place 30 g matassa pasta in 300 cc water, stand for 10 minutes, then microwave at high power for 5 min. After draining off the water, the pasta stickiness was observed and the pasta firmness was determined (by a Texture Analyzer). The results are as follows:

| Samples | Pasta firmness | Pasta stickiness |
| --- | --- | --- |
| A | 10.8 kg | not sticking |
| B | 8.9 kg | not sticking |
| C | 7.4 kg | least sticking |
| D | 4.8 kg | most sticking |

The difference between sample A & B is not as significant as that in Example 1, this being due to the fact that there is more "space" among pastas in matassa form than in a nest and therefore, the tendency for pastas to stick in matassa is less than that in a nest. Nevertheless, there is a significant difference in pasta firmness between A & B.

Example 3

A test was conducted by soaking samples A, B, C & D prepared in Example 1 in water for 1 second and 1 minute respectively and determining pasta moisture content. The samples soaked for 1 minute were also cooked in a microwave oven for 5 minutes and the pasta's stickiness & firmness were evaluated. The results are as follows:

| Samples | Soaking Time | Pasta moisture | Cooked pasta's stickiness | Cooked pasta's firmness |
| --- | --- | --- | --- | --- |
| A | 1 sec | 16.8% |  |  |
|  | 1 min | 25.1% | not sticking | 9.5 kg |
| B | 1 sec | 17.5% |  |  |
|  | 1 min | 27.8% | sticking | 8.0 kg |
| C | 1 sec | 16.9% |  |  |
|  | 1 min | 26.5% | least sticking | 6.8 kg |
| D | 1 sec | 15.2% |  |  |
|  | 1 min | 23.5% | most sticking | 5.8 kg |

These results show that the water dipping time affects moisture pick-up significantly and higher moisture, wet, "chilled" pastas can be prepared this way. These results also showed that the effect of processing methods on the stickiness and firmness of pastas delayed 1 min for microwave cooking is the same as pastas delayed 10 min for cooking (cooking condition used in Example 1 & 2) except all cooked pastas are firmer in texture because of less starch leach-out.

Example 4

A test was conducted by dipping initially steamed, uncooked pasta nests in water for different periods of time to prepare chilled, wet pastas with different moisture contents, then compared with the dry pasta sample (sample A in Examples 1 & 3 prepared by steaming/water dipping/steaming/drying process) for microwave cooking time and pasta firmness.

Sample A of the present invention was prepared by steaming the nest at 90° to 95° C. for 2 minutes, dipping into cold tap water for 1 second, steaming again at 90° to 95° C. for 8 minutes and then drying in hot air at 95° C. for 18 minutes to a moisture content of 9.5%.

Sample E was prepared by first steaming for 10 minutes at 90° to 95° C., dipping the nest into cold tap water for 1 second, and then steaming at 90° to 95° C. for 8 minutes to a moisture content of 28.5% followed by chilling to 40° C.

Sample F was prepared by first steaming the nest for 2 minutes at 900 to 95° C., dipping into cold tap water for 10 seconds, and then steaming for 8 minutes at 90° to 95° C. to a moisture content of 33.2% followed by chilling to 40° C.

Sample G was prepared by first steaming the nest for 2 minutes at 90°–95° C., dipping into cold water for 30 seconds and then steaming for 8 minutes at 90° to 95° C. to give a moisture content of 35.0%, followed by chilling to 40° C.

Sample H was prepared by first steaming the nest for 2 minutes at 90° to 95° C., dipping into cold water for 60 seconds and then steaming for 8 minutes at 90° to 95° C. to a moisture content of 38.0%; followed by chilling to 40° C.

Microwave Cooking

Place 30 g of the pasta nest in 300 cc water, stand for 1 minute and microwave cook at high power for different periods of time. The cooked pasta firmness and moisture contents were determined and shown in the following Table.

| Samples | Water dipping time | Pasta moisture | Cooking time | Cooked Pasta's firmness | Cooked Pasta's moisture |
|---|---|---|---|---|---|
| A | 1 sec | 10.0% | 5 min | 9.5 kg | 63.5% |
| E | 1 sec | 28.5% | 4 min | 8.5 kg | 62.0% |
| F | 10 sec | 33.2% | 4 min | 8.1 kg | 65.5% |
| G | 30 sec | 35.0% | 4 min | 8.4 kg | 62.2% |
| H | 60 sec | 38.0% | 3 min | 9.6 kg | 62.5% |

These results show that wet, chilled pastas with different moisture contents can be prepared by different water dipping times and the microwave cooking time of these wet pastas could be 1 to 2 minutes shorter than the dry pasta with similar pasta firmness and cooked moisture.

Example 5

Short cut dry pastas (twist, shell and spiral pastas) were steamed for 8 minutes at 90°–95° C., then sprayed with or dipped into water for 1 second and steamed again for 8 minutes. These steamed pastas were then dried at 95° C. for 20 minutes to a moisture content of about 10%. 30 g of the above-treated and untreated pastas together with 130 g water were heated in microwave oven (700 watts, high power) for 5 minutes and compared. Test results showed untreated samples were starchy and softer than the treated samples, and the firmness (by a Texture Analyzer) of cooked pastas were as follows.

| Type of pasta | Treatments | Cooked Pasta Firmness |
|---|---|---|
| Twist pastas | untreated | 4.8 kg, starchy |
| | treated | 8.2 kg, not starchy |
| Shell pastas | untreated | 5.6 kg, starchy |
| | treated | 8.6 kg, not starchy |
| Spiral pastas | untreated | 6.3 kg, starchy |
| | treated | 7.8 kg, not starchy |

In other tests, spiral pastas with different treatments were evaluated:

| Treatment methods | Dry pasta's condition | Cooked pasta's firmness |
|---|---|---|
| no treatment | not sticking | 6.7 kg, starchy |
| water dipping/ steaming/ drying | sticking | 7.3, slight starchy |
| steaming/drying | not sticking | 5.6 kg, starchy |
| steaming/water dipping/steaming/drying | slight sticking | 7.6 kg, not starchy |

Example 6

Freshly sheeted and slitted, cut raw, wet pastas (30% moisture), 1 mm×1 mm, were treated with two methods:

Steaming (195–200° F./2 minutes) followed by water spraying or dipping (30 seconds) and steaming.

Water spraying or dipping (30 seconds) followed by steaming.

Pastas prepared by treatment #1 were less sticky than the pastas prepared by treatment #2 and could be separated during cooking while the pastas prepared by treatment #2 were inseparable.

By using steaming/water addition/steaming treatment to raw, wet pastas, a pre-cooked or partially cooked pasta with moisture content ranging from 40 to 60% can be prepared.

Example 7

A pasta nest weighing 30 g consisting of vermicelli having strands of 1 mm thickness was steamed at 90° to 95° C. for 2 minutes, dipped into tap water for 1 second, steamed again at 90° to 95° C. for 8 minutes and then dried in hot air at 95° C. for 18 minutes to a moisture content of 9.5%. 50 parts of the dried pasta was mixed with 50 parts of a sauce in a can and sufficient water was added to provide a moisture content of 60% by weight based on the weight of the mixture. The mixture was sterilised while rotating the can to prevent sedimentation of the dry pasta at 125° C. for 30 minutes.

The pasta produced had an excellent texture.

I claim:

1. A process for the production of a retorted pasta and sauce product comprising steaming an uncooked pasta to surface-gelatinize the pasta to obtain a surface-gelatinized pasta, contacting the surface-gelatinized past with water to obtain a wet pasta, steaming the wet pasta to obtain a steam-treated pasta product wherein at least 50% of the steam-treated pasta product starch is gelatinized, drying the steam-treated pasta product to obtain a dried pasta product having a moisture content of from 3% to 13% and combining the dried pasta product and a sauce with water to obtain a mixture and rotary retorting the mixture to obtain a retorted product comprising retorted pasta and siuce so that the retorted pasta has a moisture content of from about 50% to 65% moisture by weight based upon a weight of the retorted product.

2. A process according to claim 1 wherein the mixture is rotary retorted to pasteurize the mixture to obtain a pasteurized retorted product.

3. A process according to claim 1 wherein the mixture is rotary retorted to sterilize the mixture to obtain a sterilized retorted product.

4. A process according to claim 1 wherein the uncooked pasta has, by weight, a moisture content of from 20% to 40% and is steamed with steam having a temperature of from 90° C. to 95° C., the surface-gelatinized pasta is contacted with water having a temperature of from 0.5° C. to 60° C., and the wet pasta is steamed with steam having a temperature of from 90° C. to 95° C.

5. A process according to claim 1 wherein the uncooked pasta has, by weight, a moisture content of from 20% to 40% and is steamed for from 10 seconds to 10 minutes, the surface-gelatinized pasta is contacted with water for from 0.5 seconds to 30 seconds, and the wet pasta is steamed for from 5 minutes to 15 minutes.

6. A process according to claim 1 wherein the surface-gelatinized pasta is contacted with water having a temperature of from 0.5° C. to 60° C.

7. A process according to claim 1 wherein the surface-gelatinized pasta is dipped into water for contacting the surface-gelatinized pasta with the water.

8. A process according to claim 1 wherein the surface-gelatinized pasta is sprayed with water for contacting the surface-gelatinized pasta with the water.

9. A process according to claim 1 wherein the surface-gelatinized pasta is contacted with water for a time of up to 10 minutes.

10. A process according to claim 1 wherein the surface-gelatinized pasta is contacted with water for a time of up to 2 minutes.

11. A process according to claim 1 wherein the un-cooked pasta is a plurality of pasta strands arranged in mass form.

12. A process according to claim 1 wherein the un-cooked pasta is a plurality of pasta strands which are folded and intertwined.

13. In a process comprising a plurality of steps for the production of a pasta product wherein, in a step, an uncooked pasta is steamed, and wherein the improvements consist essentially of:

(a) the step of steaming the uncooked pasta so that the uncooked pasta is steamed to obtain a surface-gelatinized pasta;

(b) steps of contacting the surface-gelatinized pasta with water for a time to obtain a wet pasta and steaming the wet pasta to obtain a steam-treated wet pasta product; and (c) a step of chilling the steam-treated wet pasta product at a refrigerated temperature to obtain a chilled wet pasta product or of drying the steam-treated wet pasta product to obtain a dried pasta product.

14. A process according to claim 13 wherein the steam-treated pasta product is dried to a moisture content of from 3% to 13%.

15. A process according to claim 13 wherein the un-cooked pasta has, by weight, a moisture content of from 20% to 40% and is steamed with steam having a temperature of from 90° C. to 95° C., the surface-gelatinized pasta is contacted with water having a temperature of from 0.5° C. to 60° C., and the wet pasta is steamed with steam having a temperature of from 90° C. to 95° C.

16. A process according to claim 13 wherein the un-cooked pasta has, by weight, a moisture content of from 20% to 40% and is steamed for from 10 seconds to 10 minutes, the surface-gelatinized pasta is contacted with water for from 0.5 seconds to 30 seconds and the wet pasta is steamed for from 5 minutes to 15 minutes.

17. A process according to claim 13 wherein the surface-gelatinized pasta is contacted with water having a temperature of from 0.5° C. to 60° C.

18. A process according to claim 13 wherein the surface-gelatinized pasta is dipped into water for contacting the surface-gelatinized pasta with the water.

19. A process according to claim 13 wherein the surface-gelatinized pasta is sprayed with water for contacting the surface-gelatinized pasta with the water.

20. A process according to claim 13 wherein the surface-gelatinized pasta is contacted with water for a time of up to 10 minutes.

21. A process according to claim 13 wherein the surface-gelatinized pasta is contacted with water for a time of up to 2 minutes.

22. A process according to claim 13 wherein the un-cooked pasta is a plurality of pasta strands arranged in mass form.

23. A process according to claim 13 wherein the un-cooked pasta is a plurality of pasta strands which are folded and intertwined.

* * * * *

UNITED STATES PATENT AND TRADEMARK OFFICE
CERTIFICATE OF CORRECTION

PATENT NO. : 5, 972, 407
DATED : October 26, 1999
INVENTOR(S) : Jau Yann HSU, *et al.*

It is certified that error appears in the above-identified patent and that said Letters Patent is hereby corrected as shown below:

Column 1, line 57, delete "Neither in" and insert therefor -- In --.

Column 8, line 51 (line 12 of claim 1), delete "siuce" and insert therefor -- sauce --.

Signed and Sealed this

Sixteenth Day of May, 2000

*Attest:*

Q. TODD DICKINSON

*Attesting Officer*     *Director of Patents and Trademarks*